(12) United States Patent
Singh

(10) Patent No.: US 12,380,201 B2
(45) Date of Patent: Aug. 5, 2025

(54) DETECTING SHARING OF PASSWORDS

(71) Applicant: Citrix Systems, Inc., Ft. Lauderdale, FL (US)

(72) Inventor: Manbinder Pal Singh, Coral Springs, FL (US)

( * ) Notice: Subject to any disclaimer, the term of this patent is extended or adjusted under 35 U.S.C. 154(b) by 729 days.

(21) Appl. No.: 17/457,851

(22) Filed: Dec. 6, 2021

(65) Prior Publication Data

US 2023/0177142 A1 Jun. 8, 2023

(51) Int. Cl.
*G06F 21/46* (2013.01)
(52) U.S. Cl.
CPC .................... *G06F 21/46* (2013.01)
(58) Field of Classification Search
None
See application file for complete search history.

(56) References Cited

U.S. PATENT DOCUMENTS

| 8,220,047 | B1 | | 7/2012 | Soghoina et al. |
| 8,776,196 | B1 | | 7/2014 | Oliver et al. |
| 8,838,973 | B1 | | 9/2014 | Yung et al. |
| 9,002,750 | B1 | | 4/2015 | Chu et al. |
| 9,521,127 | B1 | * | 12/2016 | Childress ................ G06F 21/46 |
| 9,736,147 | B1 | * | 8/2017 | Mead ...................... G06F 21/31 |
| 2007/0006305 | A1 | | 1/2007 | Florencio et al. |
| 2007/0067828 | A1 | | 3/2007 | Bychkov |
| 2007/0199054 | A1 | | 8/2007 | Florencio et al. |
| 2008/0098464 | A1 | | 4/2008 | Mazrah |
| 2009/0063462 | A1 | | 3/2009 | Alfonseca et al. |
| 2016/0253492 | A1 | | 9/2016 | Chougle et al. |
| 2016/0301681 | A1 | * | 10/2016 | Nakazato ................ G06F 21/35 |
| 2018/0114003 | A1 | * | 4/2018 | Uenishi ............... G06F 3/04883 |
| 2019/0327268 | A1 | * | 10/2019 | Goutal .................. H04L 63/101 |
| 2020/0389445 | A1 | * | 12/2020 | Hassan ................. H04L 9/3226 |
| 2021/0092155 | A1 | | 3/2021 | Wang et al. |

FOREIGN PATENT DOCUMENTS

WO 2021056230 A1 4/2021

* cited by examiner

*Primary Examiner* — James R Turchen

(57) ABSTRACT

A computer system configured to protect user credentials is provided. The computer system includes a memory and at least one processor coupled to the memory. The at least one processor is configured to select a number N of non-sequential positions in a password according to a selection strategy; sample the number N of characters from the password corresponding to the selected non-sequential positions; store the selected positions; store the sampled characters separately from the selected positions; detect entry of the sampled characters in the N non-sequential positions in a protected location; and perform a security action in response to the entry of the sampled characters in the protected location.

20 Claims, 11 Drawing Sheets

DETECTING SHARING OF PASSWORDS

BACKGROUND

Cyber security is an issue of great importance, as attacks on computer systems and the users of those systems continue to increase. One very prevalent, and highly damaging, form of attack is known as the "phishing attack," in which a user is tricked into willingly providing credentials, such as login passwords, to a bad actor or hacker. Another insecure practice that can become a weak link in an organization's defense strategies is sharing of passwords or passphrases, e.g. by email or messaging applications or sites. Such sharing may enable attackers to compromise accounts, and to abuse the compromised accounts for further lateral movement. Many other examples are possible.

SUMMARY

In at least one example, a client computer system configured to protect user credentials is provided. The client computer system includes a memory and at least one processor coupled to the memory. The at least one processor is configured to select a number N of non-sequential positions in a password according to a selection strategy. The at least one processor is further configured to sample the number N of characters from the password corresponding to the selected non-sequential positions. The at least one processor is further configured to store the selected positions. The at least one processor is further configured to store the sampled characters separately from the selected positions. The at least one processor is further configured to detect entry of the sampled characters in the N non-sequential positions in a protected location. The at least one processor is further configured to perform a security action in response to the entry of the sampled characters in the protected location.

At least some examples of the client computer system can include one or more of the following features. In the system, the selection strategy can include one or more of: a random selection strategy; a strategy to select positions corresponding to multiple character types; a strategy to select positions corresponding to a preferred sequence of character types; a strategy to select positions based on a frequency of character types; or an alternation between a random selection strategy and a strategy to select positions corresponding to multiple character types.

In the system, to store the sampled characters can comprise to store a hash of the sampled characters.

In the system, to store the hash of the sampled characters can comprise to store a salted hash of the sampled characters.

In the system, to store the selected positions can comprise to store a hash of the selected positions.

In the system, to detect the entry of the sampled characters can comprise to detect one or more of the following operations in an application: a paste operation; a typing operation; an autofill operation; or a dragging and dropping operation.

In the system, the application can comprise one or more of: an email application; a messaging application; a code editing or text editing application; a document editing application; a web browser; or a web or software-as-a-service application.

In the system, the processor can be further configured to identify the protected location as protected based on one or more of: an absence of a URL from a history of visited URLs for which a password has been entered; a match of a URL to an entry in a list of suspect URLs; or the detection of the entry of the sampled characters, wherein the entry is outside of a secure password entry field.

In the system, to perform the security action can comprise one or more of: to render a security warning or message; to prevent a paste operation; to prevent a message sending operation; to record details of the entry in the protected location; or to monitor a subsequent operation associated with the protected location.

In the system, the password can be obtained by one or more of: detection of an entry of the password to a visited website; or retrieval from a web browser database of saved passwords.

In the system, the password can be obtained by detection of an entry of the password to an application, a visited website, and/or a document. The detection of the entry of the password can be based on one or more of: identification of a password field; or detection of one or more obscured characters in an entry field.

In at least one example, a method of protecting user credentials is provided. The method includes acts of selecting a number N of non-sequential positions in a password according to a selection strategy, sampling the number N of characters from the password corresponding to the selected non-sequential positions, storing the selected positions, storing the sampled characters separately from the selected positions, detecting entry of the sampled characters in the N non-sequential positions in a protected location, and performing a security action in response to the entry of the sampled characters in the protected location.

At least some examples are directed to a non-transitory computer readable medium storing executable instructions to protect user credentials. In these examples, the instructions can be encoded to execute any of the acts of the method of protecting user credentials described above.

Still other aspects, examples and advantages of these aspects and examples, are discussed in detail below. Moreover, it is to be understood that both the foregoing information and the following detailed description are merely illustrative examples of various aspects and features and are intended to provide an overview or framework for understanding the nature and character of the claimed aspects and examples. Any example or feature disclosed herein can be combined with any other example or feature. References to different examples are not necessarily mutually exclusive and are intended to indicate that a particular feature, structure, or characteristic described in connection with the example can be included in at least one example. Thus, terms like "other" and "another" when referring to the examples described herein are not intended to communicate any sort of exclusivity or grouping of features but rather are included to promote readability.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and are incorporated in and constitute a part of this specification but are not intended as a definition of the limits of any particular example. The drawings, together with the remainder of the specification, serve to explain principles and operations of the described and claimed aspects. In the figures, each identical or nearly identical component that is illustrated in various figures is represented by a like numeral. For purposes of clarity, not every component may be labeled in every figure.

DETAILED DESCRIPTION

As summarized above, various examples described herein are directed to systems and methods to protect user credentials. Pasting of passwords or passphrases into unauthorized sites can be a dangerous practice. For example, phishing websites may be disguised as legitimate websites, and may fool users into attempting to log in by pasting or entering valid credentials, thereby revealing the credentials to attackers. In addition, informal sharing of passwords or passphrases, e.g. by email, Slack, or other messaging applications or sites, is an insecure practice that can be targeted by attackers and become a weak link in an organization's defense strategies.

For example, media reports stated that a Twitter hijack taking place on Jul. 15, 2020 had credentials in a slack channel. One report stated that hackers breached employee Slack accounts and found credentials for Twitter's backend pinned inside a Slack channel. This is a dangerous security practice. There are many ways this information can be misused, and many examples have occurred where attackers got hold of secrets from the Slack channels of compromised accounts and abused them for further lateral movement.

The disclosed system and methods can address such problems by detecting legitimate password entry by a user, securely storing the user's passwords, and subsequently detecting entry (e.g., by typing, pasting, autofill, or dragging and dropping) of the passwords into an insecure location, such as a different website. In order to disguise the stored passwords and to avoid false positive or false negative matches, the system can use a selection strategy to select non-sequential positions and characters from the passwords. Moreover, the system can store the positions and characters in separate secure storages, so that even if an attacker could obtain the selected characters, the attacker would still not be able to reconstruct their proper sequence.

Figure 1:
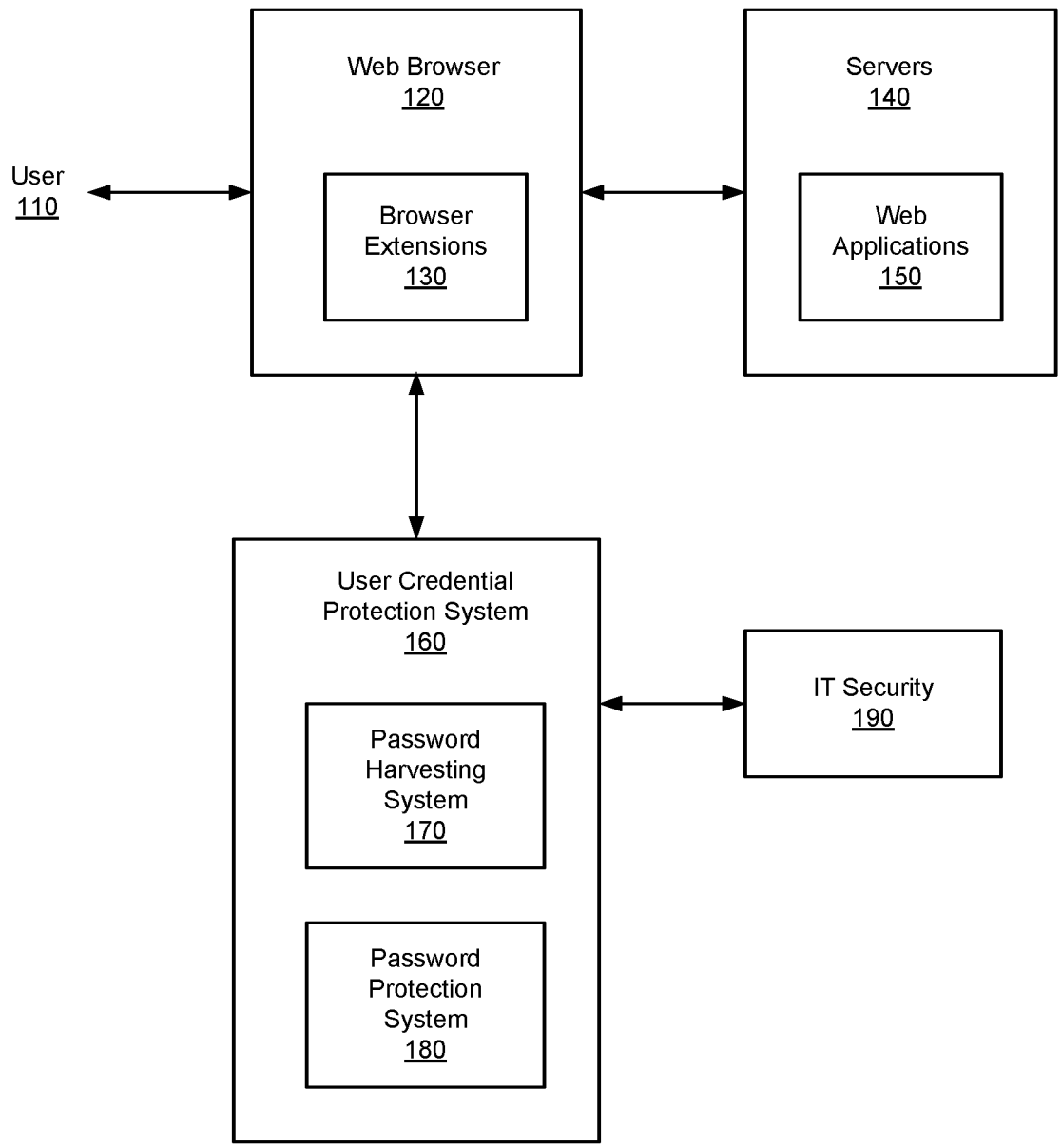
FIG. 1 is a top-level block diagram of an implementation of a system for protecting user credentials, in accordance with an example of the present disclosure.

FIG. 1 is a top-level block diagram of an implementation of a system 100 for protecting user credentials, in accordance with an example of the present disclosure. As shown in FIG. 1, the system comprises a web browser 120, including browser extensions 130, and a user credential protection system 160, including a password harvesting system 170 and a password protection system 180.

The web browser 120 is configured to enable the user 110 to navigate to servers 140 and the websites and web applications 150 hosted on those servers. The operation of user credential protection system 160 will be explained in greater detail herein, but at a high-level, the password harvesting system 170 is configured to monitor user activity to collect user passwords that are provided to legitimate websites so that these passwords will be known and available for subsequent (or concurrent) use by the password protection system 180. The password protection system 180 is configured to detect that the user is entering a password (that was identified and recorded in the harvest phase) to a different website or application, for example an email or messaging application, such as a Slack channel. In response to the detection, password protection system 180 is configured to take appropriate security measures. These measures may include alerting the user, obtaining confirmation of trust from the user, and alerting IT security/administration 190. Methods for protecting user credentials such as passwords will be described in more detail in the examples of FIGS. 4-5 below.

As described above, in examples of the disclosed system and methods, the system can disguise stored passwords and avoid false positive or false negative matches by using a selection strategy to select non-sequential positions and characters from the passwords. In some examples, the selection strategy used can be important in avoiding false positive and/or false negative matches when detecting user sharing of the password or passphrase. For example, a selection strategy that thoroughly samples the characters of the password may help avoid false positive matches. For example, if a user's password is "Florida123" and if the number of characters to be selected is N=5, a strategy of selecting the first N characters sequentially would result in "Flori." In such a case, a false positive match might result if a user were to type or paste the word "Florida," e.g. in an email, and the first N characters happen to be the same as in the password. In another example, a false negative could also result if a user were to paste a username followed by a password, e.g. into an email. Because both the username and password appear as part of a single sentence, e.g. without an end-of-sentence punctuation mark or a line break between them, the sequential character match could fail to detect the password among the first N characters of the user entry. Likewise, a non-sequential selection strategy that makes it difficult for an attacker to reconstruct the original password from the sampled characters can increase security, even in the case that the sampled characters are compromised. The disclosed system and methods can thus make mismatches less likely by providing non-sequential selection of positions in the password or passphrase, and can make password theft less likely by storing the selected positions separately from the corresponding characters.

Figure 2A:
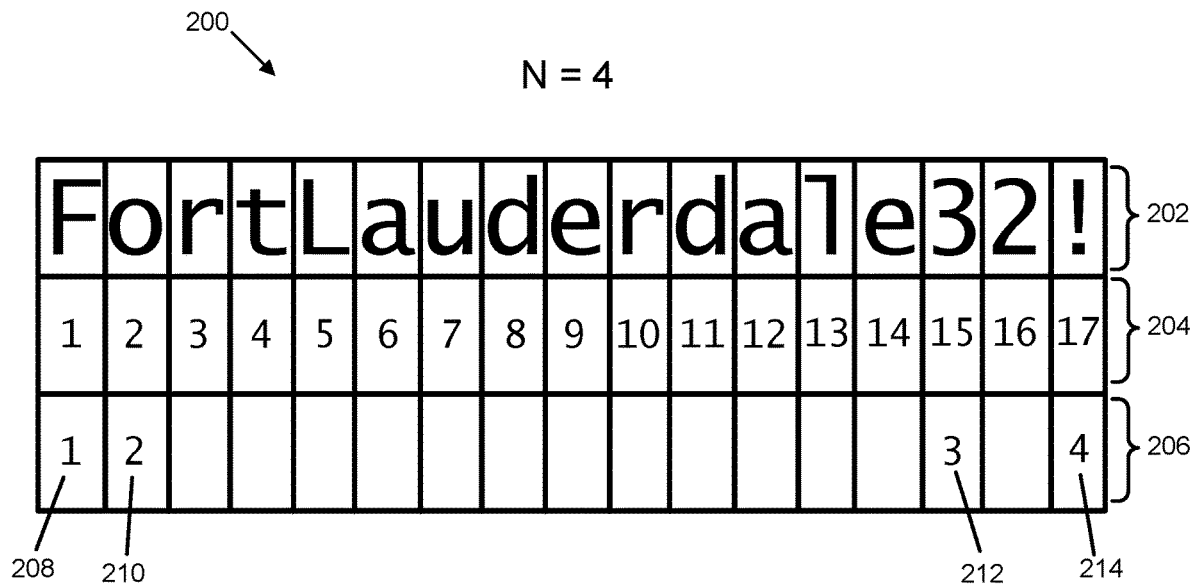
FIG. 2A illustrates selection of non-sequential positions in a password or passphrase according to a selection strategy, in accordance with an example of the present disclosure.

FIG. 2A illustrates selection 200 of non-sequential positions in a password or passphrase 202 according to a selection strategy, in accordance with an example of the present disclosure. While some example selection strategies based on selecting various character class types are described in the example of FIG. 2A, numerous variations and combinations of selection strategies are possible. In some examples, the system can alternatively or additionally use any other selection strategy, and is not limited by the present disclosure. Some example selection strategies will be described in more detail in the example of FIG. 6 below.

In this example, the password or passphrase 202 is "FortLauderdale32!" with 17 characters. In FIG. 2A, these characters are illustrated with sequential indices 204. Likewise, the selected positions and their order 206 are shown.

The system can initially select the positions 206 corresponding to characters of specific character class types. For example, the first position 208 selected corresponds to the first uppercase letter, "F," in the password 202. In this example, the first position 208 has an index 204 corresponding to the first character in the password 202. Alternatively, in some examples the system may select the last uppercase letter, or any other uppercase letter, in the password or passphrase.

Next, the second position 210 selected corresponds to the first lowercase letter, "o," in the password 202. In this example, the second position 210 has an index 204 corresponding to the second character in the password 202.

However, the system may next select the first digit in the password 202; in this example, there is no digit immediately following the second position 210. In this example, the third position 212 selected corresponds to the first digit, "3," which has an index 204 corresponding to the fifteenth character in the password 202.

Finally, the fourth position 214 selected corresponds to the first special character, "!" in the password 202, which has an index 204 corresponding to the seventeenth character in the password 202. Accordingly, in this example, the system has selected N=4 characters, corresponding to a partial password of "Fo3!".

Figure 2B:
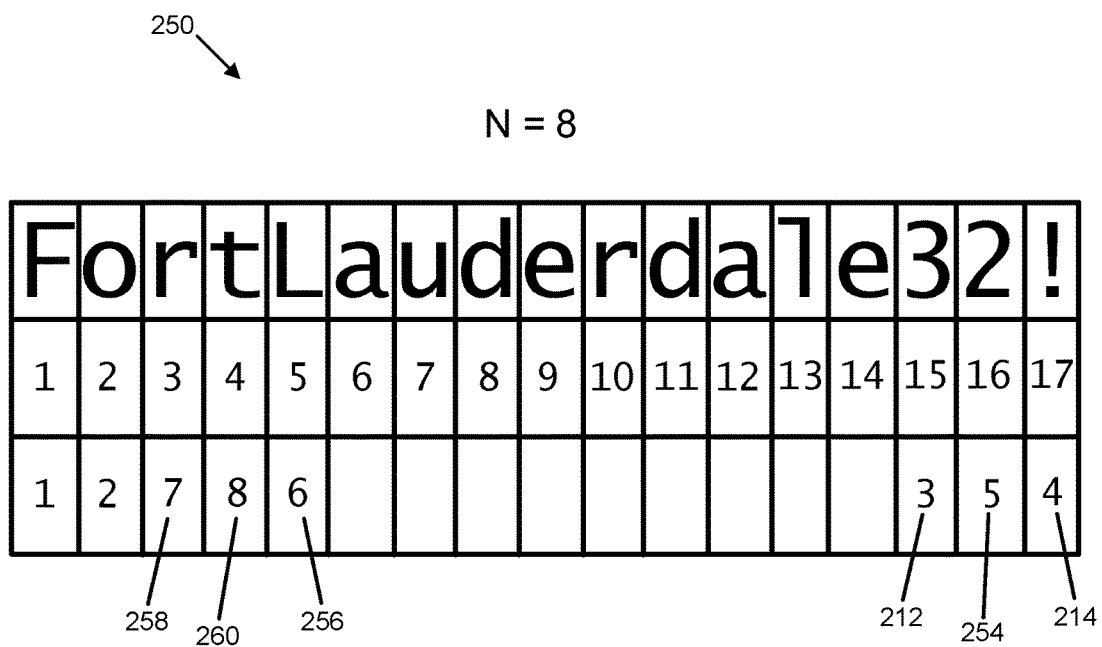
FIG. 2B illustrates selection of non-sequential positions in a password or passphrase via a mixture of two selection strategies, in accordance with an example of the present disclosure.

FIG. 2B illustrates selection 250 of non-sequential positions in a password or passphrase via a mixture of two selection strategies, in accordance with an example of the present disclosure. In this example, the user credential protection system can use a mixture of selection strategies. After selecting various character types, as in FIG. 2A above, the user credential protection system can then use one or more other selection techniques.

For example, after selecting the special character "V" as the fourth position 214, the system can then proceed to select all the remaining digits in the password 202. Accordingly, the system may next select fifth position 254 corresponding to the remaining digit, "2." The fifth position 254 has an index corresponding to the sixteenth character in the password 202.

After selecting the remaining digit "2," the system can then proceed to select all the remaining uppercase letters. In this example, the only remaining uppercase letter in the password 202, is "L," which the system selects as the sixth position 256.

The system may then proceed to select the remaining lowercase letters. However, in this example, the system only selects N=8 characters, so after selecting "L" as the sixth position 256, the system may select the next two lowercase letters. In this example, the system selects the first remaining lowercase letters, so the selected positions 258 and 260 correspond to "r" and "t," respectively. Alternatively, in some examples the system may select the last remaining lowercase letters, or any other lowercase letters.

Accordingly, in this example, the system has selected N=8 characters, corresponding to a partial password of "Fo3V2Lrt". The system can then optionally salt and/or hash this partial password as well as the selected position values and store the partial password and the selected position values in separate secure storages, as described herein. Subsequently, if a user types, pastes, or otherwise enters a string or token with the selected characters in positions corresponding to the selected positions, the system can respond by performing a security action, as described herein.

Figure 3A:
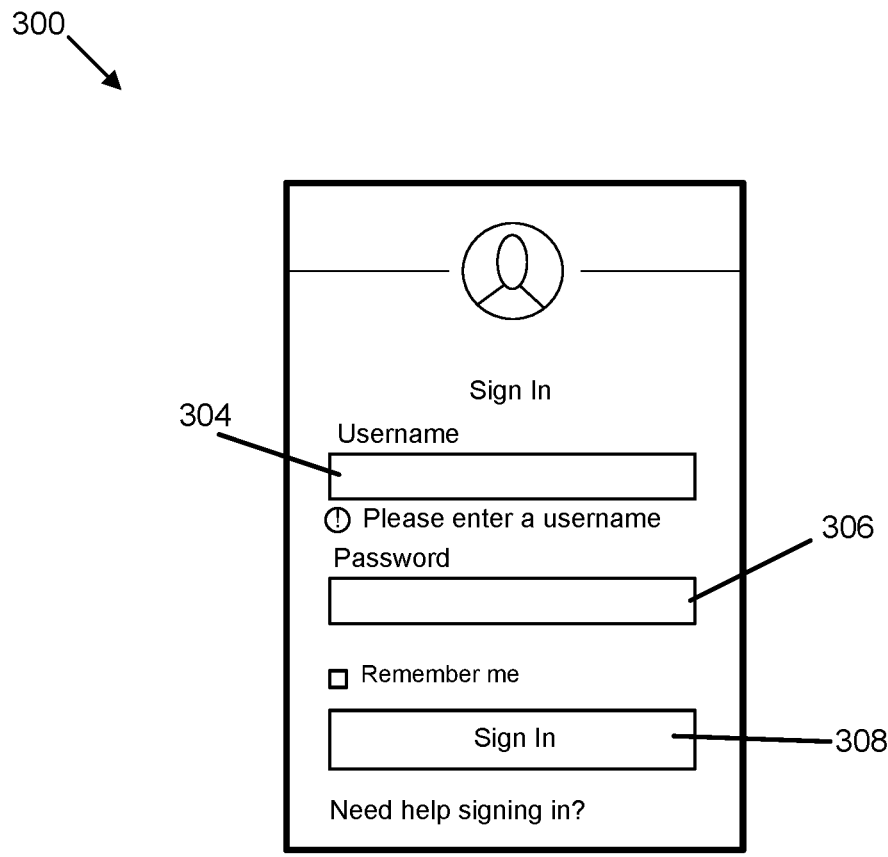
FIG. 3A illustrates detection of an entered password based on identification of a password field, in accordance with an example of the present disclosure.

FIG. 3A illustrates detection of an entered password based on identification of a password field 306, in accordance with an example of the present disclosure. In this example, the login page or screen 300 includes secure input fields for username 304 and password 306. In some examples, the fields are not necessarily secure, e.g. may be regular text entry fields. The system can set up event handlers, such as webNavigation application programming interface (APIs) that trigger in response to browsing, MutationObserver APIs that trigger in response to changes in Document Object Model (DOM) trees, window title changes, page title changes, URL changes, and the like. Such event handlers can be configured to detect user operations associated with password entry. Likewise, the user credential protection system can set up paste listeners for password fields in a login page. for example, by creating event handlers for the password fields or other DOM elements. In an example, the system can create an event handler to detect user selection of the login button 308. In some examples, the system can identify the password field 306 based on an <input type="password"> field, control or input types, and the like. Detection of an entered password based on identification of a password field will be described in more detail in the example of FIG. 8 below.

Figure 3B:
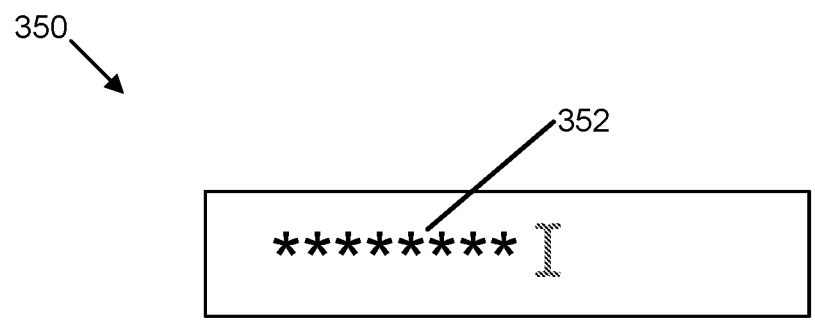
FIG. 3B illustrates detection of an entered password based on detection of obscured characters in an input field, in accordance with an example of the present disclosure.

FIG. 3B illustrates detection of an entered password based on detection of obscured characters 352 in an input field, in accordance with an example of the present disclosure. In this example, data entered in a secure field, such as a password field 350, may be displayed with special characters 352 in order to obscure the entered password or passphrase from view. In this example, the special characters 352 are asterisks. Alternatively or additionally, the special characters 352 can include bullets, dots, or any other symbols. In some examples, the system detects the special characters 352 in the password field 350, or in a change to the contents of the password field 350. Accordingly, the system can infer that the monitored input field is a password field. Detection of a password based on detection of characters in an entry field will be described in more detail in the example of FIG. 9 below.

Figure 4:
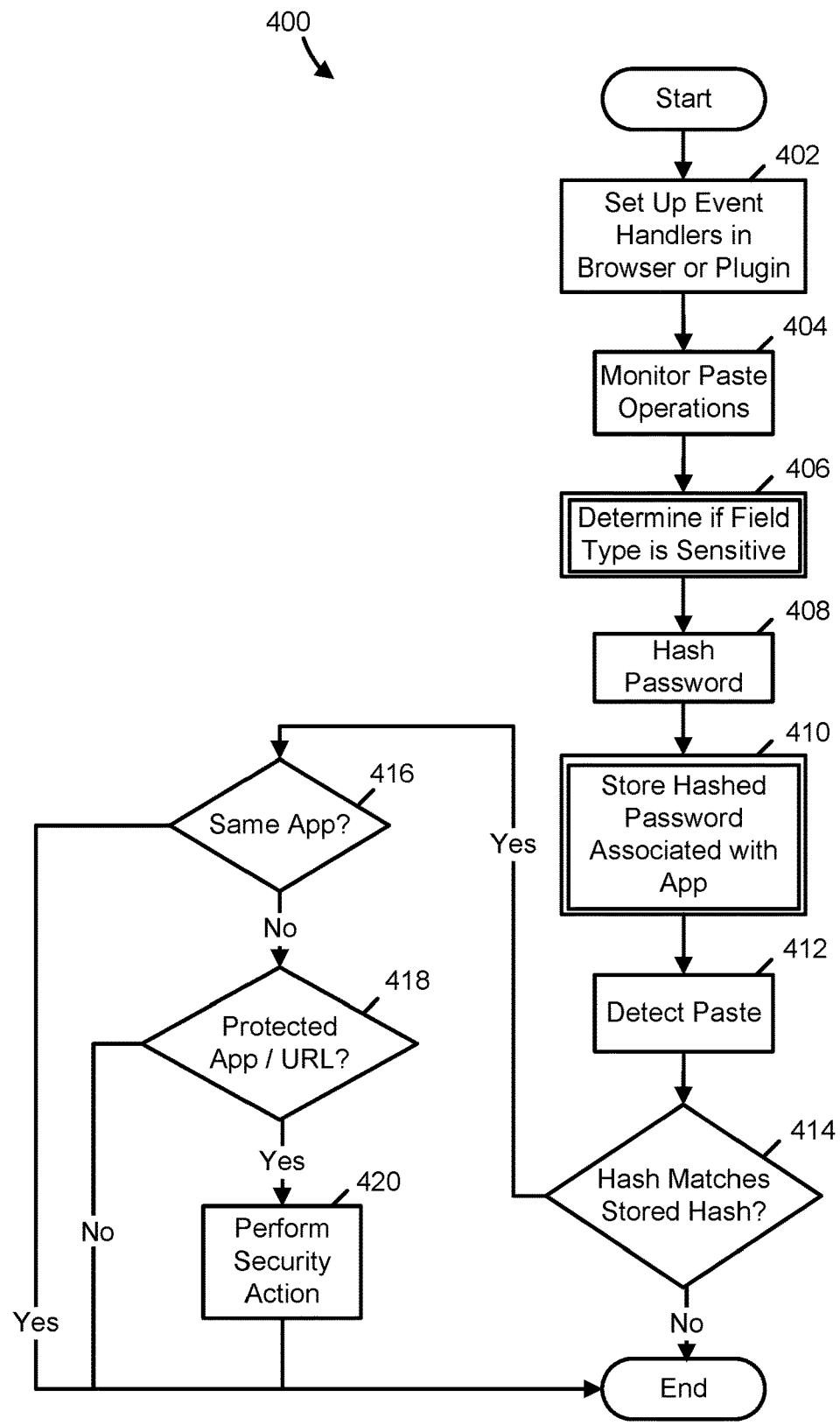
FIG. 4 is a flow diagram of a process for protecting user credentials, in accordance with an example of the present disclosure.

FIG. 4 is a flow diagram of a process 400 for protecting user credentials, in accordance with an example of the present disclosure. In various examples, the process 400 may be implemented by the user credential protection system 160 shown in FIG. 1, which may execute on an endpoint such as the client computing device 1100 in the example of FIG. 11 below. Alternatively or additionally, the process 400 may be executed by a workspace server, or may be implemented within a virtualization infrastructure, as described in the example of FIG. 10 below, and is not limited by the present disclosure. The steps of the process 400 may be modified, omitted, and/or performed in other orders, and/or other steps added.

As shown in FIG. 4, the protecting user credentials process starts with the user credential protection system setting up 402 event handlers for a user's navigation. For example, the user credential protection system can set up the event handlers in response to a user launching a web or software as a service (SaaS) application. In an example, the user credential protection system can use a mutationObserver interface in an embedded browser (e.g., Chromium) in the workspace (e.g., the digital workspace 1010 of FIG. 10), or via a browser extension or plugin. The mutationObserver interface can trigger events when changes occur to a DOM tree within a web/SaaS application, such as changes to a text input form in the web/SaaS application.

Next, the user credential protection system can monitor 404 and detect paste operations of data into a form, for example a form in the web/SaaS application launched by the user. In some examples, the user credential protection system can monitor 404 and detect other operations, such as typing, autofill, or drag and drop operations. In an example, the user credential protection system can detect any change to a text input field. For example, in the case of an autofill operation, there may not be an event generated, so the system can detect the autofill operation by monitoring for a change to the respective field.

Next, the user credential protection system can determine 406 whether the field type where the paste or other data entry operation occurs is sensitive, such as a password entry field. If the field type is sensitive, the system may infer that the pasted data includes password or passphrase credentials. In some examples, if the field type is not sensitive, the user credential protection system may ignore the paste or data entry operation.

For example, the user credential protection system can determine whether the field type is sensitive based on an <input type="password"> field, or by inspecting a label name associated with the input field, as described in the examples of FIG. 3A above and FIG. 8 below. In another example, the user credential protection system can identify obscured characters in an entry field, as illustrated in the examples of FIG. 3B above, and FIG. 9 below.

Next, the user credential protection system can optionally generate 408 a hash of the detected password. For example, the user credential protection system can use any hash method, such as SHA256 or another strong SHA mechanism. The user credential protection system can associate the generated hash with the application (e.g., a web/SaaS application URL or application/process name).

In some examples, rather than hashing or storing the password or passphrase as it is entered, the system can select non-sequential character positions in the entered password or passphrase according to a selection strategy, as illustrated in the examples of FIGS. 2A and 2B above, and FIG. 6 below. Having selected the non-sequential character positions, the system can then obtain the characters of the entered or pasted password or passphrase that correspond to the non-sequential positions. The system can then hash 408 and/or store the positions and characters, as described in FIG. 5 below. The positions and characters may be stored separately.

Next, the user credential protection system can store 410 the password or the password hash in association with the user and the application or location (e.g., a web/SaaS application URL or application/process name). The user credential protection system can store 410 the password hash locally on the client device (e.g., the computing device 1100 of FIG. 11) and/or in the workspace cloud (e.g., digital workspace server 1002 of FIG. 10).

Having detected one or more password or passphrase credentials associated with one or more applications or websites, the user credential protection system can then guard against careless or unauthorized sharing of the credentials, for example via email or messaging applications such as a Slack channel. For example, the user may subsequently launch an email or messaging web application, or simply navigate to another web location, which may be protected. The user credential protection system can then monitor 412 and detect a paste or other data entry operation of the same password or passphrase credentials into one of these protected applications.

Next, the user credential protection system can invoke a paste event handler, which can evaluate the hash and compare 414 this hash against the hash value previously stored in operation 410. Alternatively or additionally, if the password or passphrase was previously stored without a hash, the user credential protection system can compare the stored password or passphrase directly against the newly-entered or pasted data.

For example, the system can tokenize the newly-entered or pasted data, and can compare each token against the stored password or passphrase. In some examples, the system can also search variations of the newly-entered or pasted data, for example by adding or removing whitespace.

In some examples, the system executes the same selection strategy previously used on the stored password or passphrase, in order to be able to compare selected characters from the newly-entered strings or tokens to the stored non-sequential characters. For example, if a random selection strategy is used, the system may reuse the same pseudorandom number seed used previously. In another example, the system retrieves the stored non-sequential characters and/or the stored positions, and may compare the retrieved stored characters against the newly-entered characters corresponding to the same positions. For example, the paste event handler can retrieve the stored positions from a first secure storage, and can retrieve the stored non-sequential characters from a separate secure storage. The paste event handler can then select the newly-entered characters corresponding to the stored positions, and can then compare the newly-selected characters with the stored non-sequential characters, or can compare 414 the hash of the newly-selected characters with the stored hash of the non-sequential characters.

In another example, if the system has previously stored non-sequential positions and characters, it can repeat the selection strategy on the newly-entered or pasted data in order to obtain non-sequential characters corresponding to each newly-entered token. For example, the system can use the selection strategies illustrated in the examples of FIGS. 2A and 2B above, and FIG. 6 below, or can use any other selection strategy, and is not limited by the present disclosure. In another example, the system retrieves the stored non-sequential characters and/or the stored positions, and compares the stored characters against the newly-entered or pasted characters that correspond to the same positions. The user credential protection system can then compare the non-sequential characters of each token to the stored non-sequential characters of the password or passphrase. Alternatively or additionally, the system can compare the hash of the non-sequential characters of each token to the stored hash of the non-sequential characters of the password or passphrase.

If a match is found, the user credential protection system can compare 416 the application or location (e.g., a URL of a web/SaaS application) associated in operation 408 with the hash to the current application or location. In some examples, the system can also determine whether a current URL is equivalent to, or is part of a same application or site as, the original URL. For example, the system can compare the domain names, and/or can consult a web directory or whitelist. If a match is found, this indicates that data has been pasted into the same web/SaaS application for which the password or passphrase credentials were originally recorded. Accordingly, the process 400 can end.

If a match is not found, the paste operation has occurred in a different application or location than the one already associated with the password or passphrase. The user credential protection system can determine 418 whether the paste operation occurred in a protected application (e.g., Slack, email, or a SaaS or web application) or location (e.g. a URL on a protected list). In an example, this behavior can be configured by an administrator in a workspace administrator console. For example, the administrator may set a configuration keyword, such as "ProtectedLocations," for example by providing a list of protected locations, a list of safe locations, or any logical rule to determine whether a location is protected.

In some examples, the administrator can configure the system to treat all applications and/or locations as protected. For example, the administrator may set the keyword to a value such as "ProtectedLocations=*," with "*" denoting a wildcard. In this case, the system may perform a security action whenever a user paste operation, or other user input, matching the password or passphrase occurs in an application or location different from the original one.

If the current application is protected, the user credential protection system can perform 420 a security action. In an example, the user credential protection system can display a dialog or warning to the user. For example, the message of the dialog can be configured by an administrator in a workspace administrator console. In various other examples, the user credential protection system can prevent the user's paste operation, prevent the user from sending an email or message, record details of the paste or entry operation and/or the protected location, or monitor subsequent user operations in the protected location.

If the application is not protected, in some examples the system takes no action, and the process 400 can end. Alternatively or additionally, the system may follow a rule configured by an administrator in a workspace administrator console. In some examples, the system can also determine whether the field type is sensitive, as in the previous operation 406. For example, if the field type is sensitive and the application or web location is not protected, it is possible the user is reusing the same or a similar password or passphrase in a different web/SaaS application. In some examples, the system can use heuristics, logic, or machine learning to reduce the possibility of such a false positive. For example, the system may estimate a probability the new site is malicious by consulting a whitelist or blacklist of sites, scanning the site for malware, and/or by applying a heuristic to quantify this information into a probability. For example, if the system has already stored passwords for two legitimate sites, A and B, and the user inputs the password for site A into site B, it is more likely that the user has changed the password for site B, or confused the two passwords, rather than that site B has become malicious. In yet another example, the system can estimate a probability the new site can be used to share credentials with unauthorized individuals. For example, the system may apply a heuristic to estimate whether an unknown site is likely related to a known site. For example, if two sites a.example.com and b.example.com are both in the same domain, and this domain is known to belong to a reputable provider then both sites may be determined to be safe. By contrast, if the domain is known to be a completely neutral host, it is possible that b.example.com is unsafe, even if a.example.com is a known site. In some examples, the system applies machine learning to make such decisions, for example by learning from a historical dataset pooled at the workspace server (e.g., digital workspace server 1002 of FIG. 10) from multiple client devices. Such a historical dataset may include information about outcomes, e.g. whether each site turned out to be safe.

Figure 5:
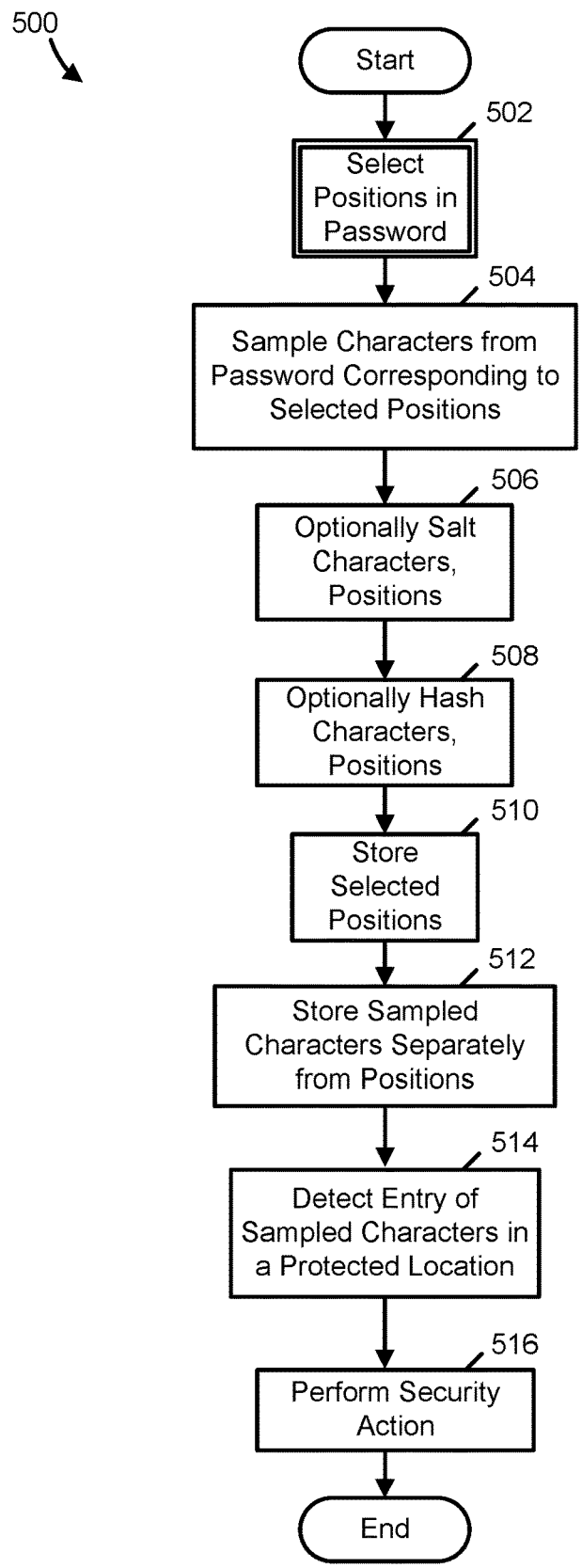
FIG. 5 is a flow diagram of a process for sampling characters from a password or passphrase to improve detection accuracy, in accordance with an example of the present disclosure.

FIG. 5 is a flow diagram of a process 500 for sampling characters from a password or passphrase to improve detection accuracy, in accordance with an example of the present disclosure. The process 500 may provide additional details of step 410 of the process 400 for protecting user credentials in FIG. 4. In various examples, the process 500 may be implemented by the user credential protection system 160 shown in FIG. 1, which may execute on a client computing device, as in the example of FIG. 11 below. Alternatively or additionally, the process 500 may be executed by a workspace server, or may be implemented within a virtualization infrastructure, as described in the example of FIG. 10 below, and is not limited by the present disclosure. The steps of the method 500 may be modified, omitted, and/or performed in other orders, and/or other steps added.

As shown in FIG. 5, the process for sampling characters from a password or passphrase starts with the user credential protection system selecting 502 a number N of non-sequential positions in a password according to a selection strategy.

Note that the selection strategy used can be important in order to avoid false positive and/or false negative results when detecting user sharing of the password or passphrase. For instance, a selection strategy that thoroughly samples the characters may help prevent false positive matches of the stored password or passphrase to a later entry by a user (e.g. in operation 414 of process 400, or operation 514 of this example). Moreover, in case the sampled characters become compromised, a non-sequential selection strategy can increase the difficulty of reconstructing the password, thus increasing security. Accordingly, the system can provide non-sequential selection of positions in the password or passphrase.

Consequently, in various examples, many non-sequential selection strategies are possible, as well as combinations thereof. For example, the selection strategy can include a random selection strategy, such as selecting each position as a distinct, uniformly-distributed random integer from among the remaining positions that have not yet been selected in the password or passphrase. In another example, the selection strategy can include a strategy to select positions corresponding to multiple character types, such as ensuring that uppercase letters, lowercase letters, digits, special characters, and the like, are included. In a third example, the selection strategy can include a strategy to select positions corresponding to a preferred sequence of such character types, such as uppercase letters first, then lowercase letters, then digits, and finally special characters. In a fourth example, the selection strategy can include a strategy to select positions based on the frequency of occurrence of each character type in the password or passphrase. The selection strategy may also include any combination of these example strategies, and/or any other strategies. In yet another example, the selection strategy can include alternation between a random selection strategy and any combination of other strategies, such as the strategies described here to select positions corresponding to multiple character types. For example, any subset of the selected positions may be selected randomly, such as every second, third, or fourth position, or any other subset of positions, while the other positions may be selected according to any other strategy. A selection strategy that includes one or more positions selected randomly may be referred to herein as a random selection strategy, and a selection strategy that results in one or more non-sequential positions may be referred to as a non-sequential selection strategy. Likewise, a selection strategy based on character types may be referred to as a character type selection strategy or a character type sequence selection strategy, and an alternation among selection strategies may be referred to as an alternating selection strategy. Some possible selection strategies are described in more detail in the examples of FIGS. 2A and 2B above and FIG. 6 below.

Next, the user credential protection system can sample 504 the number N of characters from the password corresponding to the selected non-sequential positions. Note that, while the selected positions can be non-sequential, it may be important to reproduce their order correctly. For example, if the positions are selected as "4, 5, 6, 1, 2, 8, 3," a different permutation of the same positions, such as "4, 5, 6, 1, 2, 3, 8" would not be expected to match. Accordingly, in sampling 504 the N characters corresponding to the selected non-sequential positions, the user credential protection system can sample the characters in the same order as the selected positions.

Next, the user credential protection system can optionally salt 506 the sampled characters and/or the selected positions. For example, the system can append a long salt to the end of the sampled characters and/or the selected positions. The user credential protection system may generate the salt randomly. Appending a long salt can help secure the characters and/or positions against attackers.

Next, the user credential protection system can optionally encrypt or hash 508 the sampled characters and/or the selected positions. Encrypting or hashing the sampled characters and/or the selected positions can help secure the characters and/or positions against attackers. In various examples, the user credential protection system can use any hashing method, for example SHA256, or any strong SHA mechanism. If the characters and/or positions include salts, the user credential protection system can encrypt or hash the characters and/or positions inclusive of the salts.

Next, the user credential protection system can store 510 the selected positions. In an example, an embedded or custom browser (e.g., executed by the digital workspace 1010 of FIG. 10) can store the selected positions securely in a store, similarly to how autofill passwords are stored by a browser. For example, the embedded or custom browser may prompt the user before storing the selected positions and characters of the password or passphrase, or may store the password or passphrase without prompting. In another example, an embedded or custom browser can store the selected positions using a device keychain or Data Protection API (DPAPI). In another example, the user credential protection system and/or the password harvesting system 170 of FIG. 1 stores 510 the selected positions in a secure storage. In various examples, the storage may be local to the user's endpoint, be virtualized, or be stored in the workspace server (e.g., in the secure store 1003 of FIG. 10) or elsewhere in a network or the internet (e.g., in the secure store 1026 of FIG. 10).

Next, the user credential protection system can store 512 the sampled characters separately from the selected positions. Storing the characters separately from the positions can improve security of the user credential protection system. For example, even if an attacker succeeds in obtaining the sampled characters or the selected positions, the attacker will still be unable to obtain both the characters and positions, since they can be stored in separate storage locations, e.g. in separate servers, separate directories, and/or separate databases or files. Without both the characters and positions, an attacker will be unable to reconstruct the password or passphrase. For example, obtaining the characters will be insufficient since the password or passphrase is also sensitive to the sequence of the characters. Moreover, even if an attacker could obtain both the characters and positions, the attacker would still in general only be able to determine part of the password or passphrase.

In an example, the user credential protection system can store the sampled characters securely via an embedded or custom browser, similarly to how autofill passwords are stored by a browser. In another example, an embedded or custom browser can store the sampled characters using a device keychain or DPAPI. In another example, the user credential protection system can store the sampled characters in a secure storage separately from the selected positions. For example, the sampled characters and the selected positions may be stored in separate secure storages. In some examples, one or both of these secure storages may be located within the workspace server (e.g., in the secure store 1003 of FIG. 10), or within the same data center. In another example, one storage may be in the workspace server, or the same data center, while the second secure storage may be located remotely (e.g., in the secure store 1026 of FIG. 10). In yet another example, the sampled characters and the selected positions may be stored in the same secure storage, but may be stored separately, for example they may be stored in separate folders or databases, and/or may be separately encrypted.

Next, the user credential protection system can detect 514 entry of the sampled characters in the N non-sequential positions in a protected location. For example, the system can use an event handler to detect 514 entry of the sampled characters, such as a paste event handler, and/or can monitor any changes to fields, as described in the example of FIG. 4.

In various examples, the system can determine whether the location is protected based on a list of protected locations, a list of safe locations, or any other logical rules, heuristics, or machine learning, as disclosed herein. In some examples, the administrator can configure the system to treat all applications and/or locations as protected.

In some examples, when detecting 514 entry of the sampled characters, the user credential protection system can tokenize the newly-entered or pasted data. The system can then execute the selection strategy on the tokenized data in order to obtain non-sequential characters corresponding to each newly-entered token. In some examples, the system can execute the same selection strategy previously used on the stored password or passphrase, in order to be able to compare the non-sequential characters of each newly-entered token to the stored non-sequential characters of the password or passphrase. For example, if a random selection strategy is used, the system may reuse the same pseudorandom number seed when comparing the user's input to the stored characters, so that the same characters are selected. In another example, the system may retrieve the stored non-sequential characters and/or the stored positions, and may compare the stored characters against the newly-entered characters corresponding to the same positions. For example, the system can retrieve the stored positions from a first secure storage (e.g., in the secure store 1003 or the remote secure store 1026 of FIG. 10), and can retrieve the stored non-sequential characters from a different secure storage (e.g., in a different one of the secure password stores 1003 and 1026 of FIG. 10). The system can then select, from each newly-entered token, the newly-entered characters corresponding to the stored positions. In some examples, the system can then compare the newly-selected characters with the stored non-sequential characters. Alternatively or additionally, the system can compute the hash of the non-sequential characters of each token, and then compare the hash for each token to the stored hash of the non-sequential characters of the password or passphrase.

Finally, the user credential protection system can perform 516 a security action in response to the entry of the sampled characters in the protected location. In an example, the user credential protection system can display a dialog or warning to the user. For example, the message of the dialog can be configured by an administrator in a workspace administrator console. In various other examples, the user credential protection system can prevent the user's paste operation, prevent the user from sending an email or message, record details of the paste or entry operation and/or the protected location, or monitor subsequent user operations in the protected location.

Figure 6:
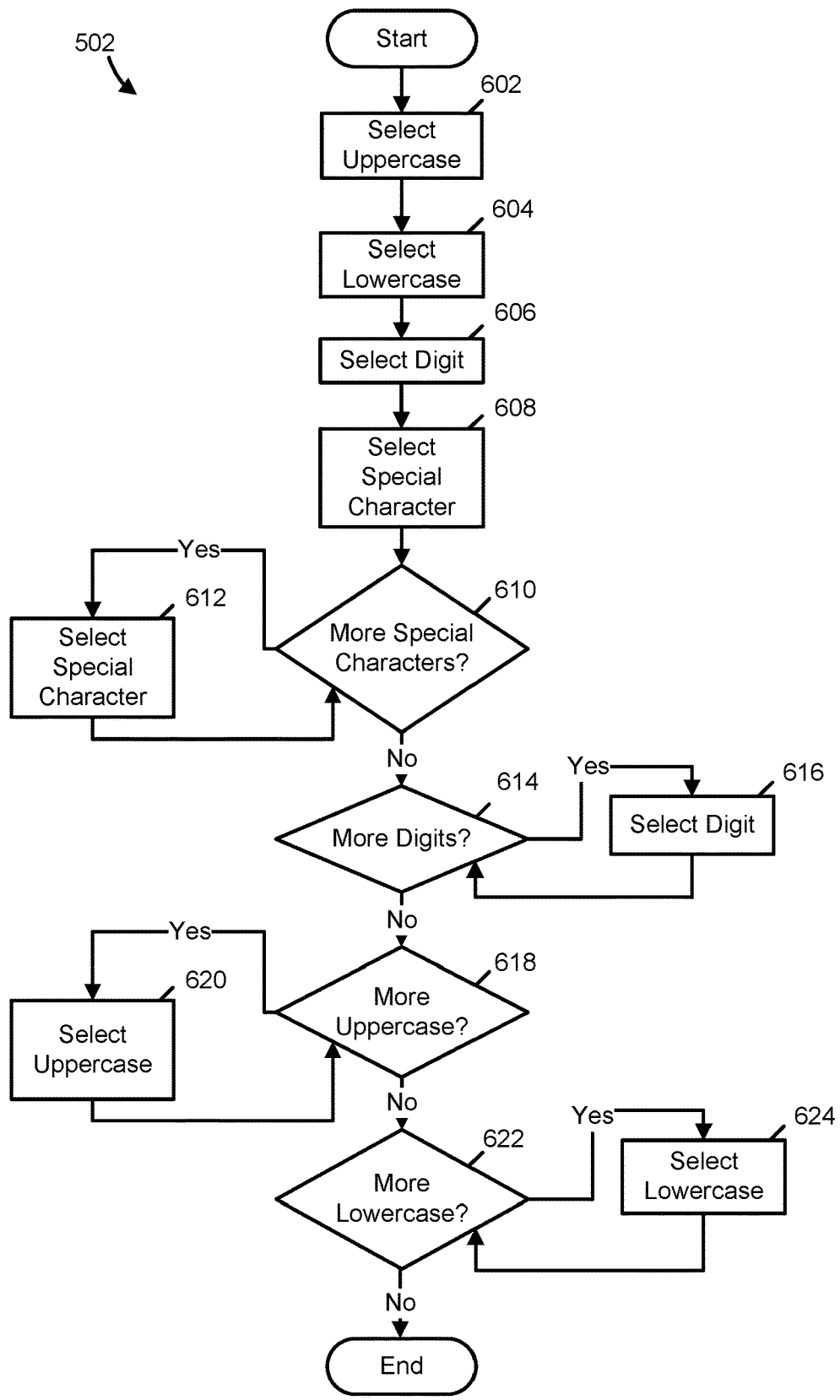
FIG. 6 is a flow diagram of a process for selection of non-sequential positions in a password or passphrase according to a selection strategy, and in accordance with an example of the present disclosure.

FIG. 6 is a flow diagram of a process 502 for selection of non-sequential positions in a password or passphrase according to a selection strategy, and in accordance with an example of the present disclosure. In this example, the process 502 may provide additional details of step 502 of the process 500 for sampling characters from a password or passphrase in FIG. 5. In various examples, the process 502 may be implemented by the user credential protection system 160 shown in FIG. 1, which may execute on a client computing device, as in the example of FIG. 11 below. Alternatively or additionally, the process 502 may be executed by a workspace server, or may be implemented within a virtualization infrastructure, as described in the example of FIG. 10 below, and is not limited by the present disclosure.

The steps of the method 502 may be modified, omitted, and/or performed in other orders, and/or other steps added. A selection strategy that thoroughly samples the characters of the password may help avoid false positive or false negative matches, while also making it difficult for an attacker to reconstruct the original password even given the sampled characters. While several non-limiting example selection strategies are described here in connection with process 502, it should be appreciated that numerous variations and combinations of the selection strategies are possible. In some examples, the system can alternatively or additionally use any other selection strategy, and is not limited by the present disclosure.

As shown in FIG. 6, the selecting non-sequential positions process starts with the user credential protection system selecting 602 uppercase letters. For example, the system may select the first uppercase letter in the password or passphrase, as in the example of FIG. 2A. Alternatively, the system can select the last uppercase letter, or any other uppercase letter, in the password or passphrase. In an example, the system can keep track of both the selected letter and the corresponding position. In this example, the system selects one uppercase letter before continuing to step 604, but the system can alternatively select any number of uppercase letters, and is not limited by the present disclosure.

Next, the user credential protection system can select 604 lowercase letters. For example, the system may select the first lowercase letter in the password or passphrase, as in the example of FIG. 2A. Alternatively, the system can select the second lowercase letter, the last lowercase letter, or some other lowercase letter, in the password or passphrase. The system can log both the selected letter and the corresponding position. In this example, the system selects one lowercase letter before continuing to step 606, but the system can alternatively select any number of lowercase letters, and is not limited by the present disclosure.

Next, the user credential protection system can select 606 digits. For example, the system may select the first digit in the password or passphrase, as in the example of FIG. 2A. Alternatively, the system can select another digit in the password or passphrase. In an example, the system can keep track of both the selected digit and the corresponding position. In this example, the system selects one digit before continuing to step 608, but the system can alternatively select any number of digits, and is not limited by the present disclosure.

Next, the user credential protection system can select 608 special characters. For example, the system may select the first special character in the password or passphrase, as in the example of FIG. 2A. Alternatively, the system can select the last available special character, or any other special character, in the password or passphrase. In an example, the system can make note of both the selected special character and the corresponding position. In this example, the system selects one special character before continuing to step 610, but the system can alternatively select any number of special characters.

In various examples, many different variations of selection strategies are possible, and are not limited by the present disclosure. For example, the user credential protection system can select any number of each type of character (e.g., uppercase letters, lowercase letters, digits, special characters, and the like), and can select the character types in any order, as in the example of FIG. 2A above. After selecting various character types, the user credential protection system can make use of one or more other selection techniques, as in the example of FIG. 2B above, and can use these techniques in any order. In the example of FIG. 6, the user credential protection system can first select one character of each type in operations 602-608, and can then search for additional characters of each type, until a total of N characters is selected. In this example, the searches for additional characters of each type can be carried out in a specific order, similar to the example of FIG. 2B above, but variations to this order are also possible. In some examples, the total number N of selected characters can also be varied. In some examples, N is not fixed, but rather the selection strategy can be carried out until some criterion is met, for example at least two characters of each type have been sampled, or the larger of N characters and ⅔ of the password length has been sampled.

Next, the user credential protection system can determine 610 whether the user entry contains additional special characters. As long as the user entry contains additional special characters, the user credential protection system can continue to select 612 the special characters. In various examples, the user credential protection system can select 612 the special characters sequentially, in reverse order, randomly, or in any other order. In some examples, the user credential protection system can select only a subset of the remaining special characters, such as a fixed number of the special characters, or can select them until another criterion is met.

Next, the user credential protection system can determine 614 whether the user entry contains additional digits, as in the example of FIG. 2B above. As long as the user entry contains additional digits, the user credential protection system can continue to select 616 the digits. In various examples, the user credential protection system can select 616 the digits sequentially, in reverse order, randomly, or in any other order. In some examples, the user credential protection system can select only a subset of the remaining digits, such as a fixed number of the digits, or can select them until another criterion is met.

Next, the user credential protection system can determine 618 whether the user entry contains additional uppercase letters. As long as the user entry contains additional uppercase letters, the user credential protection system can continue to select 620 the uppercase letters. In various examples, the user credential protection system can select 620 the uppercase letters sequentially, in reverse order, randomly, or in any other order. In some examples, the user credential protection system can select only a subset of the remaining uppercase letters, such as a fixed number of the uppercase letters, or can select them until another criterion is met.

Next, the user credential protection system can determine 622 whether the user entry contains additional lowercase letters. As long as the user entry contains additional lowercase letters, the user credential protection system can continue to select 624 the lowercase letters. In various examples, the user credential protection system can select 624 the lowercase letters sequentially, in reverse order, randomly, or in any other order. In some examples, the user credential protection system can select only a subset of the remaining lowercase letters, such as a fixed number of the lowercase letters, or can select them until another criterion is met.

Alternatively or additionally, the user credential protection system can use a mixture of three or more selection techniques. In some examples, rather than selecting all the available characters of each character type to completion, the user credential protection system can instead loop over the types of characters. For example, the user credential protection system can select one character, or any other number of characters, of each character type in order. The system can then return to select one character, or any other number of characters, of each character type in order. In some examples, the system can select a different number of characters in each iteration of the loop, or use a different criterion to determine how many characters to select in each iteration, or for each character type, and is not limited by the present disclosure.

Figure 7:
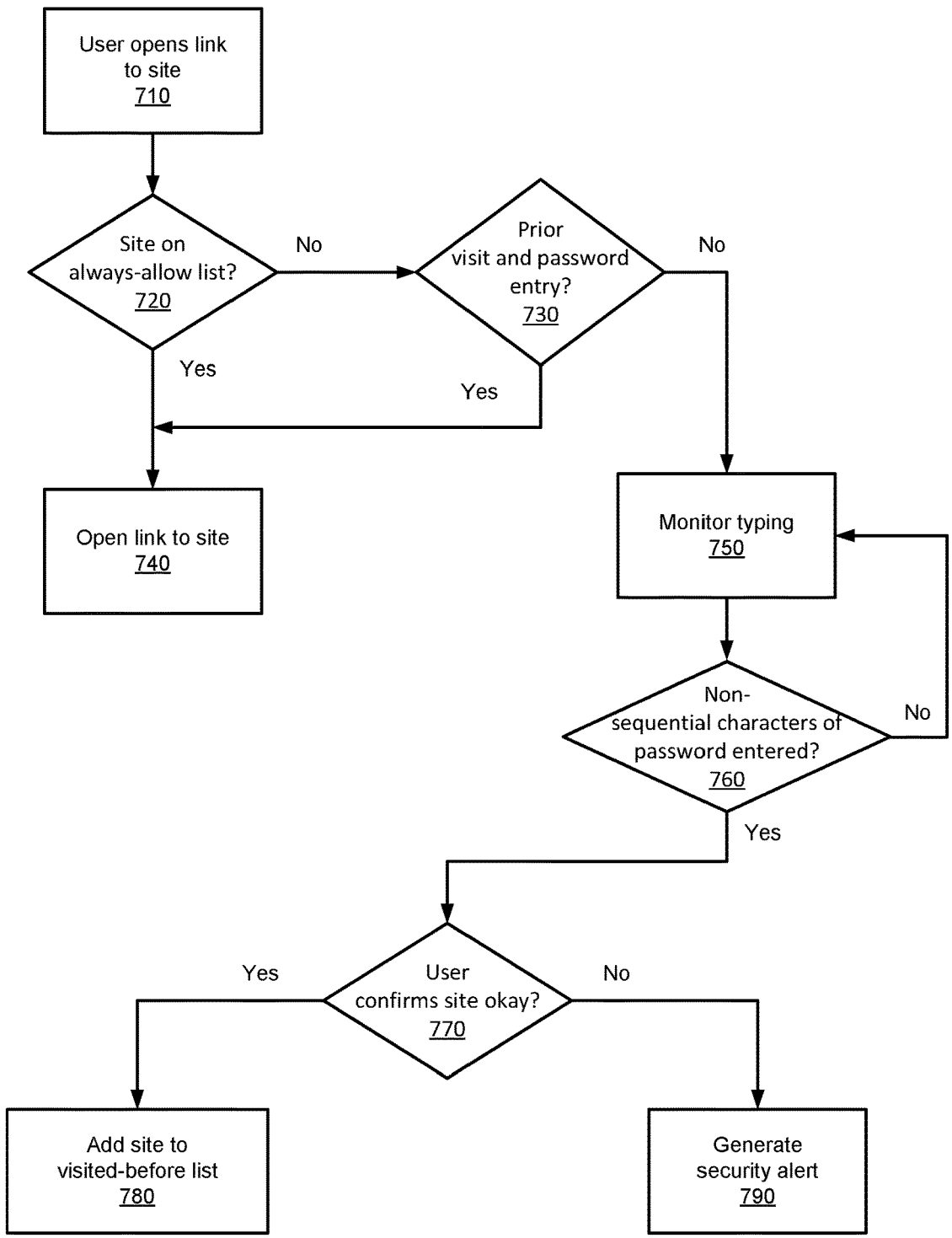
FIG. 7 is a flow diagram of a process for protecting user credentials while web browsing, in accordance with an example of the present disclosure.

FIG. 7 is a flow diagram of a process 700 for protecting user credentials while web browsing, executed by any combination of the system elements/components 160, 170, and 180, of FIG. 1, or the sub-components thereof, in accordance with an example of the present disclosure. In this example, the disclosed system elements/components (e.g., the user credential protection system 160 of FIG. 1) can protect against a user pasting or otherwise entering credentials in a protected website, such as a malicious phishing site, a webmail site, or a communication or collaboration forum.

The process 700 can start at operation 710, when the user opens a link to a website. Next, at operation 720, the system checks whether the site is on an "always-allowed" list, for example an IT provided list of websites. If so, at operation 740, the link to the website is opened. Otherwise, at operation 730, the system checks to determine if the website has been previously visited and if a password has been entered on that website (e.g., by checking a visited-before list). If so, then again, at operation 740, the link to the website is opened, since protection against that website is not needed at this point. Otherwise, at operation 750, user input is monitored, and non-sequential characters from typing, paste, autofill, and/or drag and drop operations are selected, extracted, and accumulated into a non-sequential character string. At operation 760, when a selected number (N) of non-sequential characters have been accumulated, they are encrypted and compared to the encrypted non-sequential password strings that have been stored in the harvesting process. If a match is not found, then the procedure loops back to continue monitoring at operation 750. Otherwise, if a match is found, the user may optionally be asked, at operation 770, to confirm whether or not the website is to be trusted. If the user confirms trust in the website, then at operation 780, that site may optionally be added to the visited-before list. Otherwise, at operation 790, a suitable security action may be taken. For example, a phishing alert can be generated. In some examples, the alert may show the domain for which the comparator has found the match and also the domain for the current site, as that information may be useful to some users. In various other examples, the system can prevent the user's paste or entry operation, prevent the user from sending an email or message, record details of the paste or entry operation and/or the website, or monitor subsequent user operations in the website.

Figure 8:
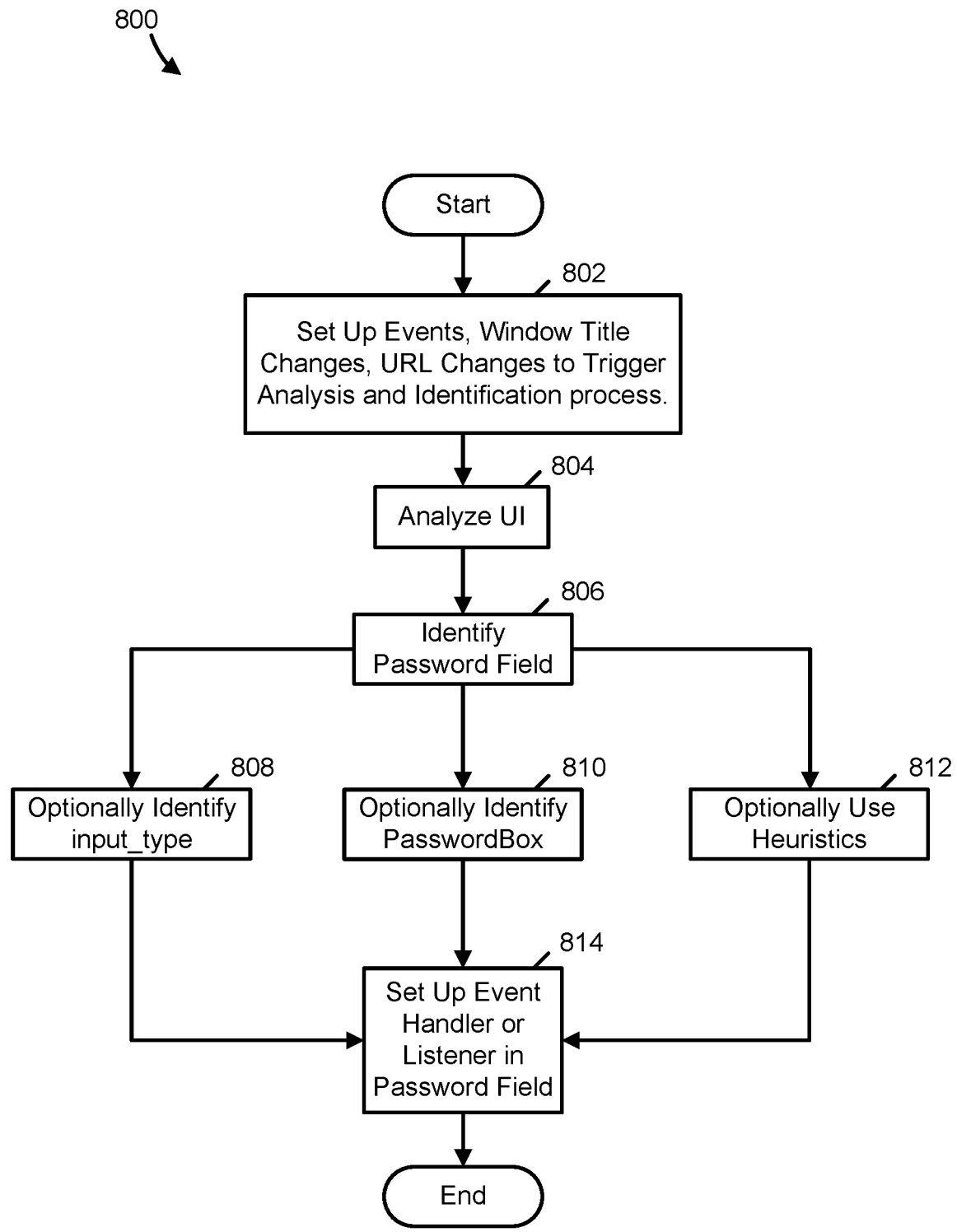
FIG. 8 is a flow diagram of a process for listening for paste operations in password or passphrase fields, in accordance with an example of the present disclosure.

FIG. 8 is a flow diagram of a process 800 for listening for paste operations in password or passphrase fields, in accordance with an example of the present disclosure. The process 800 may provide additional details of step 406 of the process 400 for protecting user credentials in FIG. 4. The implementation in this example can monitor the target web or SaaS application and analyze its UI attributes to identify a login page or screen and/or to identify the password field, similar to the example of FIG. 3A above. This implementation can then set up a paste listener for specific controls.

In various examples, the process 800 may be implemented by the user credential protection system 160 shown in FIG. 1, which may execute on an endpoint such as the client computing device 1100 in the example of FIG. 11 below. Alternatively or additionally, the process 800 may be executed by a workspace server, or may be implemented within a virtualization infrastructure, as described in the example of FIG. 10 below, and is not limited by the present disclosure. The steps of the process 800 may be modified, omitted, and/or performed in other orders, and/or other steps added.

As shown in FIG. 8, the listening for paste operations in password or passphrase fields process can start with the user credential protection system setting up 802 event handlers. In some examples, the user credential protection system can use such event handlers to determine when a new locally-executed application is launched or a new web or SaaS application is loaded, and furthermore whether a new login window, dialog, or page is loaded. For example, the system may set up webNavigation APIs to trigger events in response to browsing activity and/or MutationObserver APIs to trigger events in response to changes in DOM trees, window titles, page titles, URLs, and the like. Such event handlers may trigger the analysis and identification process (e.g., of operation 804) in order to detect login pages or screens (such as the login page or screen 300 of FIG. 3A) and password, passphrase, or username fields (such as the username field 304 and password field 306 of FIG. 3A).

Next, the user credential protection system can analyze 804 the user interface (UI) of a target application or website to identify a login page or screen. In an example, the UI analysis 804 is triggered in response to events such as browsing, a page load, and or an application launch from operation 802. In various examples, the user credential protection system can analyze the UI via a number of methods, such as UI automation or accessibility APIs for locally-executed applications (e.g., Windows or Java applications), DOM for web applications, etc. For example, the system can use UI automation or hooking to detect that a window or dialog contains secure input fields, such as username or password fields, or can inspect DOM elements such as page titles or input type tags.

Next, the user credential protection system can identify 806 password fields, as in the example of FIG. 3A above. The user credential protection system can identify 806 password fields via a number of techniques, such as the techniques illustrated in optional steps 808-812. In various examples, the system uses the identification 806 of password fields to confirm the detection of a login page or screen, e.g. based on the UI analysis 804, or as part of the detection of a login page or screen.

Next, the user credential protection system can optionally identify 808 an <input type="password"> field, or the like, of a login page for web or SaaS applications.

Next, the user credential protection system can optionally identify 810 <PasswordBox> control types for Windows Presentation Foundation (WPF) and/or Extensible Application Markup Language (XAML) applications and similar control or input types for any other locally-executed applications (e.g., Windows or Java applications), etc.

Next, the user credential protection system can optionally use 812 heuristics to identify a login page or screen and/or password, passphrase, or username fields. For example, the user credential protection system can identify a login page based on labels of the fields containing "username" or "password." Such labels can include text displayed near the input fields and/or code or script labels, such as HTML tags and the like. In another example, the system can identify a login page based on a page or window title of a login page. In various examples, the system can identify text labels, window titles, and page titles by UI automation or hooking, performing optical character recognition (OCR) on an image or screenshot of a page, window, or dialog, or by DOM, code, or scripts associated with the page or application.

Finally, the user credential protection system can set up 814 an event handler or listener for the password field in a login page. For example, the user credential protection system can invoke an addEventListener( ) method of an EventTarget DOM interface (e.g., "element.addEventListener('paste', . . . )"), thereby creating an event handler for the password field or another DOM element. In an example, the system may set up 814 a paste listener as the event listener for the password field. In this case, the system may call "element.addEventListener('paste', . . . )," and the resulting event handler can trigger in response to paste operation events into the password field or other DOM element.

In another example, the event handler can trigger in response to another data entry operation in the monitored field, such as typing, autofill, drag and drop, and the like. For example, in the case of typing, the system may use heuristics based on various factors to determine that the typing operation is complete, and thus to trigger analyzing the typed characters. In an example, the system determines that typing has completed based on the user pressing an action key, such as an "Enter" key, selecting a button such as "OK" in a dialog, or the like. In another example, the system may determine that typing has completed when the typing ceases for at least a threshold time period, such as one or two seconds. In still another example, in the case of sharing a password typed into an email, Slack message, or the like, the system may determine that the typing operation has completed based on user selection of the "Send" button. Responsive to such actions and/or to determining that the user input operation is complete, the system can trigger the event handler and process the typed characters.

Accordingly, after detecting the input, the system can determine that the pasted or otherwise entered content is a valid password or passphrase. The process 800 can then end.

Figure 9:
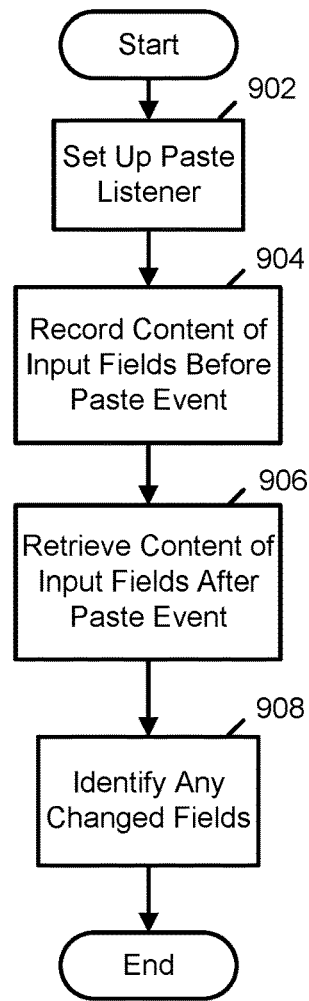
FIG. 9 is a flow diagram of a process for listening for paste operations in an application window or a document, in accordance with an example of the present disclosure.

FIG. 9 is a flow diagram of a process 900 for listening for paste operations in an application window or a document, in accordance with an example of the present disclosure. The process 900 may provide additional details of step 406 of the process 400 for protecting user credentials in FIG. 4. In various examples, the process 900 may be implemented by the user credential protection system 160 shown in FIG. 1, which may execute on an endpoint such as the client computing device 1100 in the example of FIG. 11 below. Alternatively or additionally, the process 900 may be executed by a workspace server, or may be implemented within a virtualization infrastructure, as described in the example of FIG. 10 below, and is not limited by the present disclosure. The steps of the process 900 may be modified, omitted, and/or performed in other orders, and/or other steps added.

The implementation in this example can use a paste listener in an application window or a document and/or can monitor changes in entry fields using UI automation (e.g., for a locally-executed application) or DOM (e.g., for a web or SaaS application). For example, data entered in a secure field, such as a password entry field, may be displayed with special characters (e.g., asterisks, bullets, or dots) in order to obscure the password or passphrase from view. Thus, for example, the system can compare the displayed values before and after the data entry event (e.g., paste operation) to detect the password field, similar to the example of FIG. 3B above.

As shown in FIG. 9, the listening for paste operations in an application window or document process starts with the user credential protection system setting up 902 a paste listener for a window, document, web page, or SaaS application. In an example, the paste listener can be for an individual control, such as an entry field or other input element, in the document. For example, the user credential protection system can invoke an addEventListener( ) method of an EventTarget DOM interface (e.g., "element.addEventListener('paste', . . . )"). In another example, the system can set up a paste listener for each control or input element in the document. In another example, the system can set up a paste listener for the document as a whole, e.g. through a MutationObserver API.

Next, the user credential protection system can store 904 the contents of each input element before the paste listener event is fired. For example, the user credential protection system can use the value property of a HTMLInputElement interface or the Password( ) method of a <PasswordBox> control to inquire or inspect the contents of each entry field or other input element.

Next, once the paste event listener is invoked and the paste operation completes, the user credential protection system can retrieve 906 the content of the input fields again. For example, the user credential protection system can use the value property of an HTMLInputElement interface or the Password( ) method of a <PasswordBox> control to inquire or inspect the contents of each entry field or other input element.

Next, the user credential protection system can identify 908 if any fields or input elements had changes in their value. For example, the user credential protection system can identify 908 whether any input element contains special characters (e.g., asterisks, bullets, or dots), or had a change in its value consisting of special characters, instead of the regular text of the password. Subsequent to completion of the operation 908, the process 900 can end.

Computer System Configured to Protect User Credentials

Figure 10:
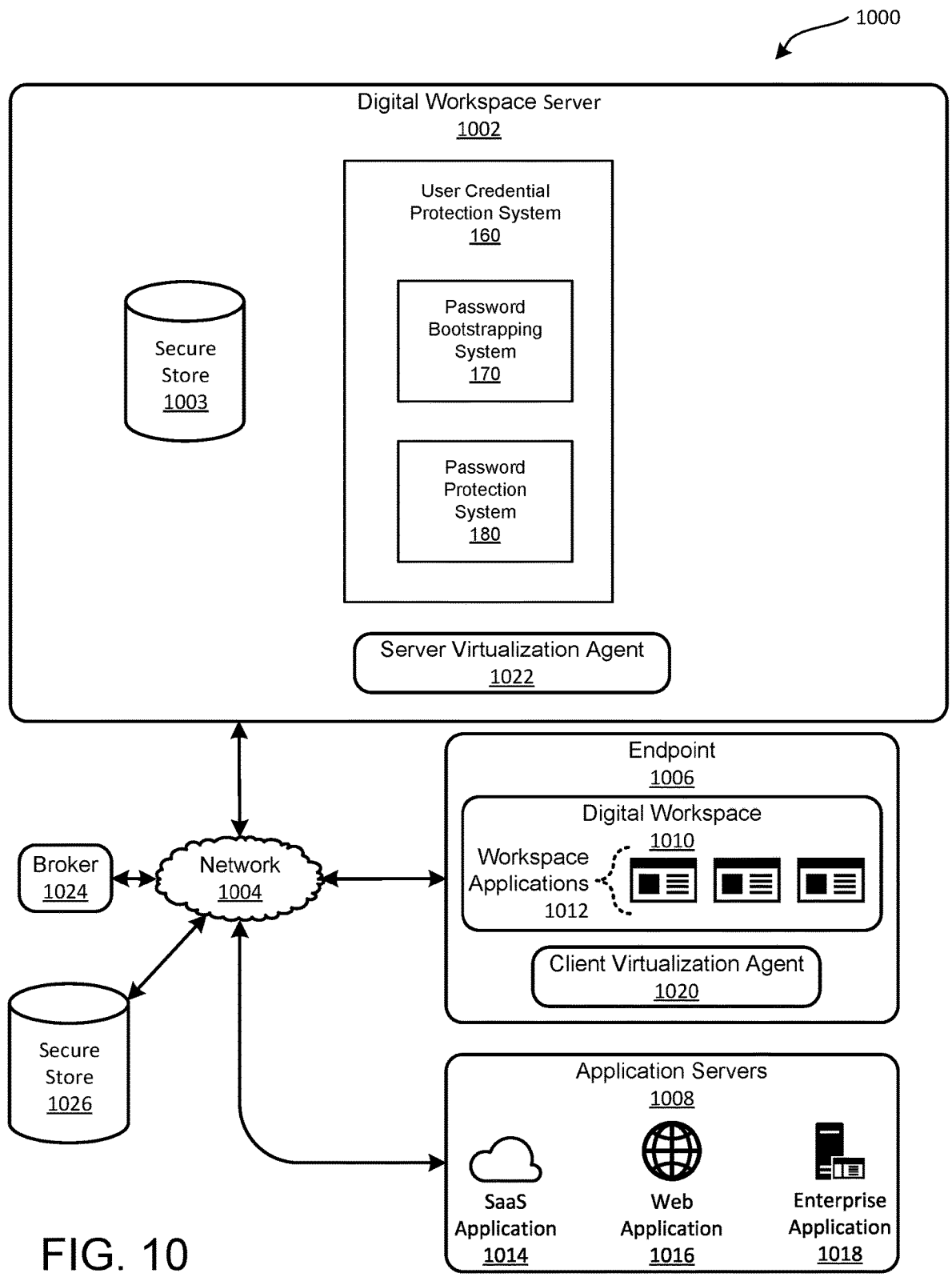
FIG. 10 is a block diagram of an example system for protecting user credentials, in accordance with an example of the present disclosure.

FIG. 10 is a block diagram of an example system 1000 for protecting user credentials, in accordance with an example of the present disclosure. The system 1000 includes a digital workspace server 1002 that is capable of analyzing how a user, associated with an endpoint 1006, interacts with applications provided by one or more application servers 1008. The user's association with the endpoint 1006 may exist by virtue of, for example, the user being logged into or authenticated to the endpoint 1006. While only one endpoint 1006 and three example application servers 1008 are illustrated in FIG. 10 for clarity, it will be appreciated that, in general, the system 1000 is capable of analyzing interactions between an arbitrary number of endpoints and an arbitrary number of application servers. The digital workspace server 1002, the endpoint 1006, and the application servers 1008 communicate with each other via a network 1004. The network 1004 may be a public network (such as the Internet) or a private network (such as a corporate intranet or other network with restricted access). In this example, the network 1004 may also include a remote secure store 1026, which may be used to store selected positions and/or characters of a password or passphrase. Other examples may have fewer or more communication paths, networks, subcomponents, and/or resources depending on the granularity of a particular implementation. For example, in some implementations at least a portion of the application functionality is provided by one or more applications hosted locally at an endpoint. Thus references to the application servers 1008 should be understood as encompassing applications that are locally hosted at one or more endpoints. It should therefore be appreciated that the examples described and illustrated herein are not intended to be limited to the provision or exclusion of any particular services and/or resources.

The digital workspace server 1002 is configured to host the user credential protection system 160, including the password harvesting system 170 and the password protection system 180, and the server virtualization agent 1022. The digital workspace server 1002 may comprise one or more of a variety of suitable computing devices, such as a desktop computer, a laptop computer, a workstation, an enterprise-class server computer, a tablet computer, or any other device capable of supporting the functionalities disclosed herein. A combination of different devices may be used in certain examples. As illustrated in FIG. 10, the digital workspace server 1002 includes one or more software programs configured to implement certain of the functionalities disclosed herein as well as hardware capable of enabling such implementation. In this example, the digital workspace server 1002 can also include a secure store 1003, which may be used to store selected positions and/or characters of a password or passphrase, as disclosed herein.

As noted above, in certain examples the endpoint 1006 can be a computing device that is used by the user. Examples of such a computing device include but are not limited to, a desktop computer, a laptop computer, a tablet computer, and a smartphone. The digital workspace server 1002 and its components are configured to interact with a plurality of endpoints. In an example, the user interacts with a plurality of workspace applications 1012 that are accessible through a digital workspace 1010, which can serve as a workspace client application at the endpoint 1006. The user's interactions with the workspace applications 1012 and/or the application servers 1008 may be tracked, monitored, and responded to by the user credential protection system 160 and/or the password protection system 180, as disclosed herein. For example, any paste operations or other data entry via the web browser 120 discussed above with reference to FIG. 1 or any other applications may be listened to or otherwise monitored, as disclosed herein. Any microapps can be made available to the user through the digital workspace 1010, thereby allowing the user to view information and perform actions without launching (or switching context to) the underlying workspace applications 1012. The workspace applications 1012 can be provided by the application servers 1008 and/or can be provided locally at the endpoint 1006. For instance, the example workspace applications 1012 can include the web browser 120 discussed above with reference to FIG. 1, as well as a SaaS application 1014, a web application 1016, and an enterprise application 1018, although any other suitable exiting or subsequently developed applications can be used as well, including proprietary applications and desktop applications. To enable the endpoint 1006 to participate in a virtualization infrastructure facilitated by the broker computer 1024 and involving the server virtualization agent 1022 as discussed herein, the endpoint 1006 also hosts the client virtualization agent 1020.

The broker computer 1024 is configured to act as an intermediary between the client virtualization agent 1020 and the server virtualization agent 1022 within the virtualization infrastructure. In some examples, the broker computer 1024 registers virtual resources offered by server virtualization agents, such as the server virtualization agent 1022. In these examples, the broker computer 1024 is also configured to receive requests for virtual resources from client virtualization agents, such as the client virtualization agent 1020, and to establish virtual computing sessions involving the client virtualization agent 1020 and the server virtualization agent 1022.

Computing Device

Figure 11:
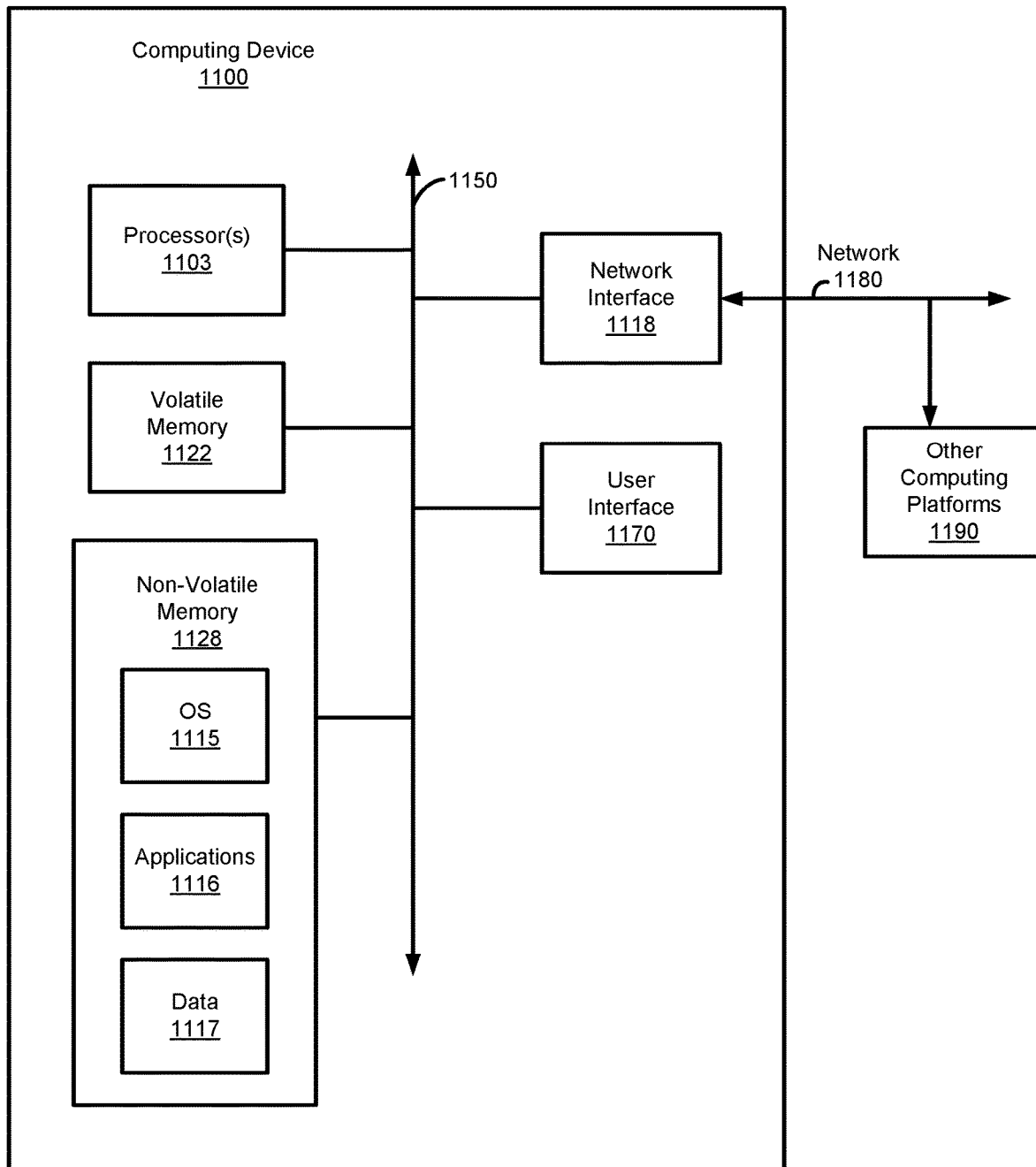
FIG. 11 is a block diagram of a computing device configured to implement various systems and processes in accordance with examples disclosed herein.

FIG. 11 is a block diagram of a computing device configured to implement various systems and processes in accordance with examples disclosed herein.

The computing device 1100 includes one or more processor(s) 1103, volatile memory 1122 (e.g., random access memory (RAM)), non-volatile memory 1128, a user interface (UI) 1170, one or more network or communication interfaces 1118, and a communications bus 1150. The computing device 1100 may also be referred to as a client device, computing device, endpoint device, computer, or a computer system.

The non-volatile (non-transitory) memory 1128 can include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 1170 can include a graphical user interface (GUI) (e.g., controls presented on a touchscreen, a display, etc.) and one or more input/output (I/O) devices (e.g., a mouse, a keyboard, a microphone, one or more speakers, one or more cameras, one or more biometric scanners, one or more environmental sensors, and one or more accelerometers, one or more visors, etc.).

The non-volatile memory 1128 stores an OS 1115, one or more applications or programs 1116, and data 1117. The OS 1115 and the application 1116 include sequences of instructions that are encoded for execution by processor(s) 1103. Execution of these instructions results in manipulated data. Prior to their execution, the instructions can be copied to the volatile memory 1122. In some examples, the volatile memory 1122 can include one or more types of RAM and/or a cache memory that can offer a faster response time than a main memory. Data can be entered through the user interface 1170 or received from the other I/O device(s), such as the network interface 1118. The various elements of the device 1100 described above can communicate with one another via the communications bus 1150.

The illustrated computing device 1100 is shown merely as an example client device or server and can be implemented within any computing or processing environment with any type of physical or virtual machine or set of physical and virtual machines that can have suitable hardware and/or software capable of operating as described herein.

The processor(s) 1103 can be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations can be hard coded into the circuitry or soft coded by way of instructions held in a memory device and executed by the circuitry. A processor can perform the function, operation, or sequence of operations using digital values and/or using analog signals.

In some examples, the processor can be include one or more application specific integrated circuits (ASICs), microprocessors, digital signal processors (DSPs), graphics processing units (GPUs), microcontrollers, field programmable gate arrays (FPGAs), programmable logic arrays (PLAs), multicore processors, or general-purpose computers with associated memory.

The processor(s) 1103 can be analog, digital or mixed. In some examples, the processor(s) 1103 can be one or more local physical processors or one or more remotely-located physical processors. A processor including multiple processor cores and/or multiple processors can provide functionality for parallel, simultaneous execution of instructions or for parallel, simultaneous execution of one instruction on more than one piece of data.

The network interfaces 1118 can include one or more interfaces to enable the computing device 1100 to access a computer network 1180 such as a Local Area Network (LAN), a Wide Area Network (WAN), a Personal Area Network (PAN), or the Internet through a variety of wired and/or wireless connections, including cellular connections and Bluetooth connections. In some examples, the network 1180 may allow for communication with other computing devices 1190, to enable distributed computing. The network 1180 can include, for example, one or more private and/or public networks over which computing devices can exchange data.

In described examples, the computing device 1100 can execute an application on behalf of a user of a client device. For example, the computing device 1100 can execute one or more virtual machines managed by a hypervisor. Each virtual machine can provide an execution session within which applications execute on behalf of a user or a client device, such as a hosted desktop session. The computing device 1100 can also execute a terminal services session to provide a hosted desktop environment. The computing device 1100 can provide access to a remote computing environment including one or more applications, one or more desktop applications, and one or more desktop sessions in which one or more applications can execute.

The processes disclosed herein each depict one particular sequence of acts in a particular example. Some acts are optional and, as such, can be omitted in accord with one or more examples. Additionally, the order of acts can be altered, or other acts can be added, without departing from the scope of the apparatus and methods discussed herein.

Having thus described several aspects of at least one example, it is to be appreciated that various alterations, modifications, and improvements will readily occur to those skilled in the art. For instance, examples disclosed herein can also be used in other contexts. Such alterations, modifications, and improvements are intended to be part of this disclosure and are intended to be within the scope of the examples discussed herein. Accordingly, the foregoing description and drawings are by way of example only.

The invention claimed is:

1. A server computer system configured to protect user credentials, the server computer system comprising:
    a memory; and
    at least one processor coupled to the memory and configured to:
        select a number N of non-sequential positions in a password according to a selection strategy;
        sample the number N of characters from the password corresponding to the selected non-sequential positions;
        store the selected positions;
        store the sampled characters separately from the selected positions;
        detect entry of the sampled characters in the N non-sequential positions in a protected location; and
        perform a security action in response to the entry of the sampled characters in the protected location.

2. The server computer system of claim 1, wherein the selection strategy includes one or more of:
    a random selection strategy;
    a strategy to select positions corresponding to multiple character types;
    a strategy to select positions corresponding to a preferred sequence of character types;
    a strategy to select positions based on a frequency of character types; or
    an alternation between a random selection strategy and a strategy to select positions corresponding to multiple character types.

3. The server computer system of claim 1, wherein to store the sampled characters comprises to store a hash of the sampled characters.

4. The server computer system of claim 3, wherein to store the hash of the sampled characters comprises to store a salted hash of the sampled characters.

5. The server computer system of claim 1, wherein to store the selected positions comprises to store a hash of the selected positions.

6. The server computer system of claim 1, wherein to detect the entry of the sampled characters comprises to detect one or more of the following operations in an application:
   a paste operation;
   a typing operation;
   an autofill operation; or
   a dragging and dropping operation.

7. The server computer system of claim 6, wherein the application comprises one or more of:
   an email application;
   a messaging application;
   a code editing or text editing application;
   a document editing application;
   a web browser; or
   a web or software-as-a-service application.

8. The server computer system of claim 1, wherein the processor is further configured to identify the protected location as protected based on one or more of:
   an absence of a URL from a history of visited URLs for which a password has been entered;
   a match of a URL to an entry in a list of suspect URLs; or
   the detection of the entry of the sampled characters, wherein the entry is outside of a secure password entry field.

9. The server computer system of claim 1, wherein to perform the security action comprises one or more of:
   to render a security warning or message;
   to prevent a paste operation;
   to prevent a message sending operation;
   to record details of the entry in the protected location; or
   to monitor a subsequent operation associated with the protected location.

10. The server computer system of claim 1, wherein the password is obtained by one or more of:
    detection of an entry of the password to a visited website; or
    retrieval from a web browser database of saved passwords.

11. The server computer system of claim 1, wherein the password is obtained by detection of an entry of the password to an application, a visited website, and/or a document, and wherein the detection of the entry of the password is based on one or more of:
    identification of a password field; or
    detection of one or more obscured characters in an entry field.

12. A method of protecting user credentials, the method comprising:
    selecting a number N of non-sequential positions in a password according to a selection strategy;
    sampling the number N of characters from the password corresponding to the selected non-sequential positions;
    storing the selected positions;
    storing the sampled characters separately from the selected positions;
    detecting entry of the sampled characters in the N non-sequential positions in a protected location; and
    performing a security action in response to the entry of the sampled characters in the protected location.

13. The method of claim 12, wherein the selection strategy includes one or more of:
    a random selection strategy;
    a strategy to select positions corresponding to multiple character types;
    a strategy to select positions corresponding to a preferred sequence of character types;
    a strategy to select positions based on a frequency of character types; or
    an alternation between a random selection strategy and a strategy to select positions corresponding to multiple character types.

14. The method of claim 12, wherein:
    storing the sampled characters comprises storing a hash of the sampled characters; or
    storing the selected positions comprises storing a hash of the selected positions.

15. The method of claim 12, wherein detecting the entry of the sampled characters comprises detecting one or more of the following operations in an application:
    a paste operation;
    a typing operation;
    an autofill operation; or
    a dragging and dropping operation.

16. The method of claim 15, wherein the application comprises one or more of:
    an email application;
    a messaging application;
    a code editing or text editing application;
    a document editing application;
    a web browser; or
    a web or software-as-a-service application.

17. A non-transitory computer readable medium storing executable sequences of instructions to protect user credentials, the sequences of instructions comprising instructions to:
    select a number N of non-sequential positions in a password according to a selection strategy;
    sample the number N of characters from the password corresponding to the selected non-sequential positions;
    store the selected positions;
    store the sampled characters separately from the selected positions;
    detect entry of the sampled characters in the N non-sequential positions in a protected location; and
    perform a security action in response to the entry of the sampled characters in the protected location.

18. The non-transitory computer readable medium of claim 17, wherein the selection strategy includes one or more of:
    a random selection strategy;
    a strategy to select positions corresponding to multiple character types;
    a strategy to select positions corresponding to a preferred sequence of character types;
    a strategy to select positions based on a frequency of character types; or
    an alternation between a random selection strategy and a strategy to select positions corresponding to multiple character types.

19. The non-transitory computer readable medium of claim 17, wherein:
    to store the sampled characters comprises to store a hash of the sampled characters; or
    to store the selected positions comprises to store a hash of the selected positions.

20. The non-transitory computer readable medium of claim 17, wherein to detect the entry of the sampled characters comprises to detect one or more of the following operations into an email application, a messaging application, a document editing application, or a web or software-as-a-service application:

a paste operation;
a typing operation;
an autofill operation; or
a dragging and dropping operation.

* * * * *